(12) United States Patent
Suzuki et al.

(10) Patent No.: US 9,397,572 B2
(45) Date of Patent: Jul. 19, 2016

(54) CONTROL APPARATUS FOR DC-DC CONVERTER

(75) Inventors: Yuuki Suzuki, Kariya (JP); Toshiyuki Kouno, Kariya (JP); Shinya Goto, Gifu (JP)

(73) Assignee: DENSO CORPORATION, Kariya (JP)

( * ) Notice: Subject to any disclaimer, the term of this patent is extended or adjusted under 35 U.S.C. 154(b) by 908 days.

(21) Appl. No.: 13/561,453

(22) Filed: Jul. 30, 2012

(65) Prior Publication Data

US 2013/0027978 A1    Jan. 31, 2013

(30) Foreign Application Priority Data

Jul. 30, 2011    (JP) .................. 2011-167856

(51) Int. Cl.
  *H02M 3/335*  (2006.01)
  *H02M 1/32*   (2007.01)
  *H02J 7/14*   (2006.01)
  *H02M 1/00*   (2006.01)

(52) U.S. Cl.
  CPC .......... *H02M 3/33507* (2013.01); *H02J 7/1423* (2013.01); *H02M 1/32* (2013.01); *H02M 2001/0022* (2013.01)

(58) Field of Classification Search
  CPC ............................... B60R 16/03; H02M 3/335
  USPC ................................. 307/9.1, 10.1
  See application file for complete search history.

(56) References Cited

U.S. PATENT DOCUMENTS

| 3,967,181 | A * | 6/1976 | Chambers et al. ............. 363/23 |
| 2004/0136212 | A1 * | 7/2004 | Abe et al. ......................... 363/59 |
| 2008/0309163 | A1 * | 12/2008 | Hashimoto et al. ............. 307/31 |
| 2011/0260781 | A1 * | 10/2011 | Takeuchi et al. ............... 327/537 |
| 2014/0009855 | A1 * | 1/2014 | Yamamoto ....................... 361/42 |

FOREIGN PATENT DOCUMENTS

| JP | 2006-101680 | 4/2006 |
| JP | 2010-207020 | 9/2010 |

OTHER PUBLICATIONS

Office Action (2 pages) dated Jul. 2, 2013, issued in corresponding Japanese Application No. 2011-167856 and English translation (3 pages).

* cited by examiner

*Primary Examiner* — Kenneth B Wells
*Assistant Examiner* — James P Evans
(74) *Attorney, Agent, or Firm* — Nixon & Vanderhye PC

(57) ABSTRACT

An apparatus controls a DC-DC converter that converts an input voltage to an output voltage. The DC-DC converter includes a switching element having a duty ratio controlled by the apparatus to regulate the output voltage, a first transformer, a second transformer and a capacitor. A terminal voltage applied between input and output terminals of the switching element varies depending on the duty ratio and the input voltage. The apparatus may be configured to: limit the duty ratio in response to the input voltage represented by a modulated signal; enable the DC-DC converter to continue to convert the input voltage to the output voltage when an abnormal condition of the modulated signal is determined; and limit the duty ratio of the switching element when the abnormal condition is determined. Main and sub switching elements of the switching element and the capacitor are disposed between the first and second transformers.

16 Claims, 3 Drawing Sheets

US 9,397,572 B2

CONTROL APPARATUS FOR DC-DC CONVERTER

CROSS-REFERENCE TO RELATED APPLICATION

This application is based on and claims the benefit of priorities from earlier Japanese Patent Application No. 2011-167856 filed on Jul. 30, 2011, the description of which are incorporated herein by reference.

BACKGROUND

1. Technical Field

The present disclosure relates to control apparatuses for controlling a DC-DC converter having a switching element, and more particularly to a control apparatus for controlling a DC-DC converter in which the duty ratio of the switching element is controlled to convert an input voltage value of the converter to a predetermined output voltage value.

2. Description of the Related Art

In this type of DC-DC converter, the voltage applied between an input terminal and an output terminal of the switching element depends on the duty ratio of the switching element and the input voltage of the DC-DC converter.

As a control apparatus for controlling the DC-DC converter, for example, Japanese Patent Application Laid-Open number 2006-101680 discloses a control apparatus including a detecting circuit that detects an input voltage of the DC-DC converter in an on-vehicle high voltage system which is a primary side of the DC-DC converter. The control apparatus outputs a signal responding to the detected voltage value to a control device of the DC-DC converter in an on-vehicle low voltage system. The signal responding to the detected voltage value is obtained by a well-known PWM (pulse width modulation) processing of which the carrier frequency is changed depending on cases when detecting excessive high voltage or detecting voltage within normal range.

As a result, in the low voltage system having the control device that controls switching elements included in the DC-DC converter, when the carrier frequency corresponds to a case when detecting excessive high voltage, the control apparatus stops operating the DC-DC converter since reliability of the switching elements may degrade due to a voltage being applied between the input terminal and the output terminal of the switching element when the input voltage is excessively high.

Also, in the low voltage system, the control apparatus controls the duty ratio of the switching elements to be restricted in response to the voltage level of the PWM signal. In particular, when the input voltage obtained by decoding the PWM signal is excessively high, the DC-DC converter is controlled to be turned OFF.

It is noted that the high voltage system and the low voltage system are electrically isolated, and the low voltage system is connected to the vehicle-body.

The inventors have found that common mode noise increases when a failure such as an insulation failure occurs between on-vehicle high voltage system such as motor generator and the vehicle-body so that the noise is superimposed on the signal which is PWM processed. In this case, the input voltage obtained by decoding the PWM signal becomes excessively high so that the DC-DC converter may be stopped even when the DC-DC converter can be driven.

SUMMARY

The embodiment provides a newly developed control apparatus for a DC-DC converter in which the control apparatus operates the duty ratio of the switching element so as to control the output voltage of the DC-DC converter. In the DC-DC converter, the voltage applied between an input terminal and an output terminal of a switching element included therein depends on both the duty ratio of the switching element and the input voltage of the DC-DC converter.

As a first exemplary embodiment, an apparatus for controlling a DC-DC converter is described that converts an input voltage having a predetermined range to an output voltage, the DC-DC converter including a switching element of which duty ratio is controlled by the apparatus to regulate the output voltage, a terminal voltage applied between an input terminal and an output terminal of the switching element varies depending on the duty ratio and the input voltage, the apparatus includes: acquiring means for acquiring the input voltage; converting means for converting the input voltage to a modulated signal representing the input voltage; first limiting means for limiting the duty ratio of the switching element in response to the input voltage represented by the modulated signal; first determining means for determining whether or not the modulated signal is in abnormal condition; and enabling means for enabling the DC-DC converter to continue to convert the input voltage to the output voltage when the first determining means determines the abnormal condition. The enabling means includes second limiting means for limiting the duty ratio of the switching element, the second limiting means limit the duty ratio of the switching element when the first determining means determines the abnormal condition.

According to the first exemplary embodiment, the voltage applied between the input terminal and the output terminal of the switching element depends on the input voltage and the duty ratio of the switching element. Therefore, in response to level of the input voltage, the duty ratio is restricted whereby the excessive voltage applied to the input terminal and the output terminal of the switching element can be avoided. However, when the input voltage is abnormal, depending on the converting means, excessive voltage applied to the input terminal and the output terminal may not be avoided. Therefore, the above-described first aspect of the embodiment includes the enabling means wherein the voltage conversion between the input voltage to the output voltage can be maintained and at the same time, excessive voltage being applied between the input terminal and the output terminal can be avoided.

As a second exemplary embodiment, the second limiting means forcibly limits the duty ratio so as to limit the terminal voltage to be within a breakdown voltage between the input terminal and the output terminal of the switching element, corresponding to the predetermined range of the input voltage.

As a third exemplary embodiment, the converting means is configured to execute PWM processing to produce the modulated signal and the apparatus further comprises second determining means for determining whether or not the input voltage is within the predetermined range; and switching means for switching carrier frequency used for the PWM processing between a first carrier frequency used when the second determining means determines the input voltage is within the predetermined range and a second carrier frequency used when the second determining means determines the input voltage is out of the predetermined range, and the first determining means determines the modulated signal is in an abnormal condition when the second determining means determines the input voltage is out of the predetermined range, even when the carrier frequency is set as the first carrier frequency.

According to the third exemplary embodiment, when the modulated signal corresponds to the first frequency representing the normal operation, the input voltage can be recognized within the predetermined range. However, if the input voltage represented by the modulated signal is out of the predetermined range, correct value of the input voltage cannot be recognized and therefore enabling means enables the DC-DC converter to continue to convert the input voltage to the output voltage. As a result, the DC-DC converter continues to convert the input voltage to the output voltage and excessive voltage being applied to the input terminal and the output terminal can be avoided.

As a fourth exemplary embodiment, the converting means is configured to execute PWM processing to produce the modulated signal and the apparatus further comprises second determining means for determining whether or not the input voltage is within the predetermined range; and switching means for switching carrier frequency used for the PWM processing between a first carrier frequency used when the second determining means determines the input voltage is within the predetermined range and a second carrier frequency used when the second determining means determines the input voltage is out of the predetermined range, and the first determining means determines the modulated signal is in abnormal condition when the carrier frequency used for the PWM processing corresponds to neither the first carrier frequency nor the second carrier frequency.

According to the fourth exemplary embodiment, even when the reliability of the information about the input voltage that superposed to the modulated signal is low, since the duty ratio is restricted, the DC-DC converter continues to convert the input voltage to the output voltage, and excessive voltage being applied to the input terminal and the output terminal can be avoided.

As a fifth exemplary embodiment, the input voltage is a terminal voltage of a DC power source used for an on-vehicle main unit, the DC power source includes a power conversion circuit connected between the DC power source and the on-vehicle main unit, and the carrier frequency is set to be larger than a switching frequency of a switching element included in the power conversion circuit.

According to the fifth exemplary embodiment, noise may be superposed to the modulated signal due to a switching operation of the power conversion circuit. However, the carrier frequency of the modulated signal is set to be higher than that of the switching element whereby the occurrence of error in the information about the input voltage can be avoided.

As a sixth exemplary embodiment, the apparatus includes reset means for resetting the second limiting means such that the reset limiting means resets the second limiting means to stop limiting the duty ratio and to set the duty ratio to be a value used for normal condition when the first determining means determines the modulated signal is in normal condition.

As a seventh exemplary embodiment, the reset means includes gradual changing means for gradually changing the duty ratio when the first determining means determines the modulated signal is in normal condition such that the duty ratio is gradually changed to a duty ratio corresponding to the normal condition from a duty ratio limited by the second limiting means.

According to the seventh exemplary embodiment, the gradual changing means is configured to avoid rapid change of the output voltage when resetting the second limiting means to stop limiting the duty ratio.

DETAILED DESCRIPTION OF PREFERRED EMBODIMENTS

With reference to the drawings, hereinafter will be described an embodiment of the present disclosure wherein a control apparatus of the DC-DC converter is adapted to a DC-DC converter that converts the voltage of the DC power source used for an on-vehicle main unit to be stepped down.

Figure 1:
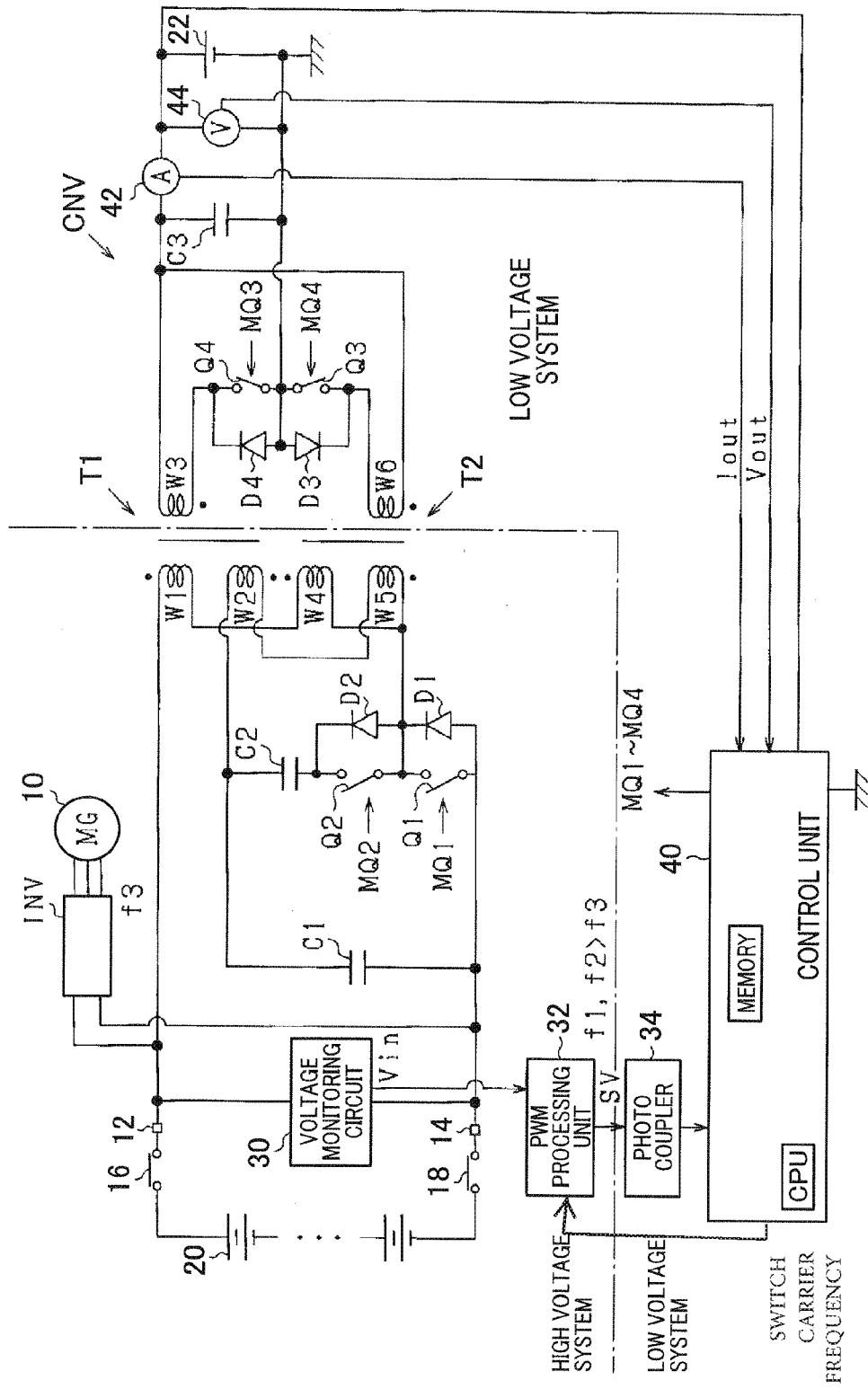
FIG. 1 is a circuit diagram showing an overall system configuration according to the first embodiment of the present disclosure.

A system configuration according to the embodiment is illustrated as shown in FIG. 1.

The motor generator 10 as shown in FIG. 1 serves as a main unit mounted on the vehicle and mechanically connected to a driving wheel (not shown) of the vehicle. The motor generator 10 is electrically connected to a high voltage battery 20 via an inverter INV, connectors 12 and 14 and relay circuits 16 and 18. The high voltage battery 20 serves as a DC power source of which the terminal voltage exceeds 100 volts, i.e., secondary battery.

The DC-DC converter CNV generates a predetermined voltage stepped down (e.g. 12V) from the voltage at the high voltage battery 20 and supplies the predetermined voltage to a low voltage battery 22. The DC-DC converter CNV is an isolated converter including a first transformer T1 and a second transformer T2. The first transformer includes a primary coil W1 and W2, and a secondary coil W3. The second transformer T2 includes a primary coil W4 and W5, and secondary coil W6.

At one terminal of the primary coil W1 of the first transformer T1, the positive terminal of the high voltage battery 20 is connected. At the other terminal of the primary coil W1, one terminal of the primary coil W4 of the second transformer T2 is connected. The other terminal of the primary coil W4 of the second transformer T2 is connected to one terminal of the primary coil W5 of the second transformer T2. Further, at the other terminal of the primary coil W5 of the second transformer T2, one terminal of the primary coil W2 of the first transformer T1 is connected. The other terminal of the primary coil W2 of the first transformer T1 is connected to the negative terminal of the high voltage battery 20 via the capacitor C1.

A main switching element Q1 is connected between one terminal of the primary coil W5 of the second transformer T2 and the negative terminal of the high voltage battery 20. A diode D1 is connected in parallel to the main switching element Q1. The diode D1 is connected to be in reverse direction.

A capacitor C2 and sub switching element Q2 are connected in parallel between the other terminal of the primary coil W1 of the first transformer T1 and one terminal of the primary coil W5 of the second transformer T2. A diode D2 is connected in parallel to the sub switching element Q2. The diode D2 is connected to be in reverse direction. It is noted that the sub switching element Q2 and the capacitor C2 constitute an active clamp circuit.

Switching elements Q3 and Q4 used for synchronous rectification are connected between one terminal of the secondary coil W3 of the first transformer T1 and one terminal of the secondary coil W6 if the second transformer T2. Moreover, the other terminal of the secondary coil W3 of the first transformer T1 and the other terminal of the secondary coil W6 of the second transformer T2 are short circuited. A capacitor C3 is connected between a point short-circuited and a junction point at which the switching elements Q3 and Q4 are connected. The low voltage battery 22 is connected in parallel to the capacitor C3.

A voltage monitoring circuit 30 detects an input voltage Vin (terminal voltage of the high voltage battery 20) of the DC-DC converter CNV and outputs the Vin to a PWM processing unit 32. Specifically, the voltage monitoring circuit 30 divides the terminal voltage to be an input voltage range of the PWM processing unit 32 and outputs the divided voltage to the PWM processing unit 32. The PWM processing unit 32 performs PWM processing in which input voltage Vin and the carrier signal are compared thereby generating a PWM signal SV where the input voltage Vin is represented by a duty ratio (ratio between a high-duration and a period consisting of high duration and low duration) and outputting the PWM signal SV. The carrier frequency of the carrier signal is defined as f1 during normal operation, and defined as f2 (<f1) during an abnormal operation wherein the input voltage Vin is excessively high or low which is regarded as noise. The voltage monitoring circuit 30 corresponds to acquiring means.

The PWM signal SV outputted by the above-described PWM processing unit 32 is acquired by a control unit 40 via a photo coupler 34. The photo coupler 34 electrically isolates between the on-vehicle high voltage system including the high voltage battery 20 and the on-vehicle low voltage system including the control unit 40 and transmits the PWM signal SV under the isolation. As shown in FIG. 1, high voltage system and low voltage system is shown by a dashed line. The PWM processing unit 32 and the photo coupler 34 correspond to converting means.

The control unit 40 controls the main switching element Q1, the sub switching element Q2, the switching elements Q3 and Q4 on the basis of an output current Tout of the DC-DC converter CNV detected by a current sensor 42 and an output voltage Vout of the DC-DC converter detected by a voltage sensor 44, whereby the input voltage Vin is converted to the output voltage Vout (i.e., conversion processing). Specifically, the main switching element Q1 and the sub switching element Q2 are alternately ON (i.e., complementary operation) in which the switching elements Q3/Q4 are controlled to be synchronized to the switching elements Q1/Q2.

When the main switching element Q1 is turned ON and the sub switching element Q2 is turned OFF, the switching element Q3 turns ON and the switching element Q4 turns OFF. Therefore, a loop path including the high voltage battery 20, the primary coils W1 and W4, and the main switching element Q1 is closed. As a result, the transformer T2 outputs current to the capacitor C3 via the secondary coil W6. At the same time, the capacitor C1 is discharged via a loop path including the capacitor C1, the primary coil W2 and W5, and the main switching element Q1.

On the other hand, when the main switching element Q1 turns OFF and the sub switching element turns ON, the switching element Q3 turns OFF and the switching element Q4 turns ON. In this case, voltage is applied to the primary coils W4 and W1 via a loop path including the capacitors C1 and C2, the sub switching element Q2, the primary coils W4 and W1, and the high voltage battery 20, and the polarity of the voltage is opposite to the one when the main switching element Q1 is turned ON. Hence, the transformer T1 outputs current to the capacitor C3 via the secondary coil W3. Moreover, the capacitor C1 is charged via a loop path including the primary coils W5 and W2, and the capacitor C1.

Figure 2:
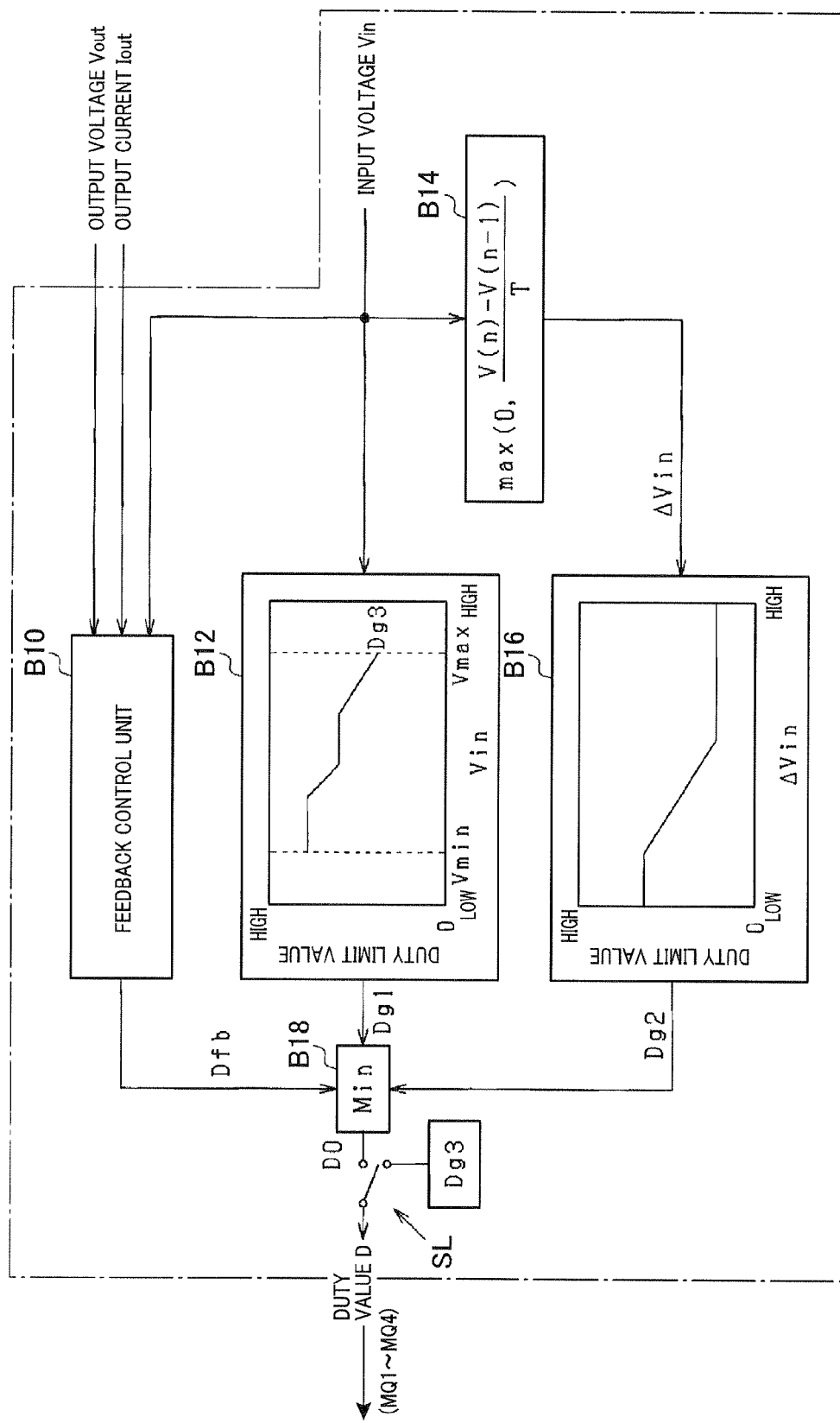
FIG. 2 is a block diagram showing a processing for setting a duty value according to the first embodiment.

The control unit 40 controls the output voltage Vout in response to the duty ratio (duty value D) which is a ratio between ON duration and a period where the main switching element Q1 turns ON and OFF. The control unit 40 controls the output voltage Vout referring to the PWM signal SV. Specifically, when the carrier frequency of the PWM signal SV is f2 representing an abnormal operation, the control unit 40 forcibly stops the conversion processing by the DC-DC converter CNV to convert the input voltage Vin to the output voltage Vout (i.e., the control unit 40 controls the main switching element Q1 and the sub switching element Q2 to be turned OFF). Meanwhile, when the carrier frequency of the PWM signal SV is f1 representing a normal operation, the control unit 40 performs a guard processing applied to the duty value D on the basis of the PWM signal SV and drives the DC-DC converter CNV. FIG. 2 is a block diagram showing a detail drive processing of the DC-DC converter. It is noted that the guard processing is performed to restrict the duty value D (described later).

A feedback control unit B10 calculates a base value D-fb of the duty value D on the basis of the output voltage Vout and output current Iout of the DC-DC converter CNV in order to perform a feedback control of the output voltage Vout and the output current Tout. Meanwhile, a first guard processing device B12 calculates, on the basis of the input voltage Vin, a first guard value Dg1 of the duty value D. The first guard value Dg1 is defined between the lower limit voltage Vmin and the upper limit voltage Vmax. The first guard value Dg1 is set such that the larger the input voltage Vin, the smaller the first guard value Dg1. The first guard value Dg1 is set in order to avoid excessive voltage being applied between the input terminal and the output terminal of the main switching element Q1. That is to say, when the main switching element Q1 turns OFF and the sub switching element Q2 turns ON, voltage of the capacitors C1 and C2 which is Vin/(1−D) is applied to the switching element Q1. Therefore, while the voltage applied to the switching element Q1 does not exceed the breakdown voltage VQM between the input terminal and the output terminal of the main switching element Q1, the first guard value Dg1 is set to be smaller when the input voltage Vin becomes larger so as to set the duty value D to be within a value determined by the feedback control unit B10 as much as possible.

The above-described upper limit voltage Vmax is set to be a maximum voltage value of the high voltage battery 20 in the normal operation. This voltage is equivalent to a lower limit voltage at which the PWM processing unit 32 changes the carrier frequency of the PWM signal SV to be f2.

Meanwhile, the lower limit voltage Vmin is a value to determine whether or not a connection failure at the connectors 12 or 14 as shown in FIG. 1 occurs. Specifically, when the connection failure occurs at the connectors 12 or 14, voltage between the input terminals of the DC-DC converter CNV, which is a lower potential than the connectors 12 and 14, decreases. Moreover, when the connection failure occurs, a resistance value of the wiring at the connectors 12 and 14 may vary. Therefore, the voltage at the input terminal of the DC-DC converter CNV may decrease and then increase rapidly. In this case, due to surge voltage, excessively high voltage may be applied between the input terminal and the output terminal of the main switching element Q1. In this instance, the lower limit voltage Vmin is used effectively to detect such a failure.

A variation calculation unit B14 calculates an increasing rate of the input voltage Vin such that an amount of variation ΔVin of the input voltage Vin is defined by using a differential value of the input voltage Vin by time, or zero, whichever is larger.

A second guard processing device B16 calculates a second guard value Dg2 on the basis of the amount of the variation ΔVin. The second guard value Dg2 is used to avoid excessive voltage applied between the input terminal and the output terminal of the main switching element Q1 even when updating of the first guard value Dg1 is delayed due to the input voltage Vin being varied. The second guard value Dg2 is set such that the larger the variation ΔVin, the smaller the second guard value Dg2. The second guard value Dg2 is constant value when the variation ΔVin is lower than a first predetermined value. The second guard value Dg2 gradually decreases as the variation ΔVin increases when the variation ΔVin exceeds the first predetermined value and becomes constant value when the variation ΔVin exceeds a second predetermined value. As described above, the variation calculation unit B14 calculates the ΔVin in such a manner. Similarly, the second guard value Dg2 is defined only when the variation ΔVin increases. This is because the first guard value Dg1 is sufficient for the guard processing when the input voltage Vin is decreasing.

A minimum value selecting unit B18 selects a minimum value among the base value D-fb, the first guard value Dg1 and the second guard value Dg2 and set a duty value D0 to the selected value. The duty value D0 set by the minimum value selecting unit B18 is used as a duty value when the input voltage Vin has been converted to the output voltage Vout normally. A selector SL selects the duty value D0 as the duty value D in the normal operation.

Assuming an isolation failure happens between the on-vehicle high voltage system and the vehicle-body, common mode noise is likely to propagate to the low voltage system from the high voltage system when the inverter INV is switching in the high voltage system. Therefore, when the common mode noise propagates to the low voltage system, the noise is superposed on the secondary side of the photo coupler 34 so that the pulse width of logical High level on the PWM signal SV which is received by the control unit 40 is affected by the noise. As a result, reliability of the information about the input voltage Vin may be degraded.

Practically, when the noise is superposed on the secondary side of the photo coupler 34, the signal representing the information about input voltage which is superposed on the PWM signal exceeds the upper limit voltage Vmax or falls below the lower limit voltage Vmin. Under this circumstance, when having the DC-DC converter CNV stop, the low voltage battery 22 cannot be charged so that the vehicle cannot run when decreasing the stored charge in the low voltage battery 22. This is because the low voltage battery 22 serves as a power source that supplies power to apparatuses such as the control apparatus for operating the inverter INV having a control object (i.e., motor generator 10).

When the PWM signal SV corresponds to the frequency f1, the input voltage Vin ranges from the lower limit voltage Vmin to the higher limit voltage Vmax so that the DC-DC converter CNV can continue the conversion processing to convert the input voltage Vin to the output voltage Vout. In this instance, according to the embodiment, the selector SL selects the third guard value Dg3 whereby the duty value D is fixed to the third guard value DG3 and the DC-DC converter CNV continues to convert the input voltage Vin to the output voltage Vout. The third guard value Dg3 is set to a value of the first guard value Dg1 when the duty value corresponds to the upper limit voltage Vmax. The third guard value Dg3 is set in order to avoid excessively high voltage being applied between the input terminal and the output terminal of the main switching element Q1, even if the input voltage Vmin varies between the lower limit voltage Vmin and the upper limit voltage Vmax. As described, the first guard value, the second guard value and the third guard value are used in order to restrict the duty value D.

Further, according to the embodiment, the carrier frequencies f1 and f2 of the PWM signal SV are set to be higher than the switching frequency of the inverter INV. This is because a dominant component in the common mode noise being superposed on the secondary side of the above-described photo coupler 34 is a noise caused by the switching of the inverter INV. Therefore, since the carrier frequency f1 and f2 are set to be higher than the switching frequency f3, even when the common mode noise is superposed on the PWM signal SV, frequency of noise being superposed on the PWM signal SV in a predetermined period can be lowered.

Figure 3:
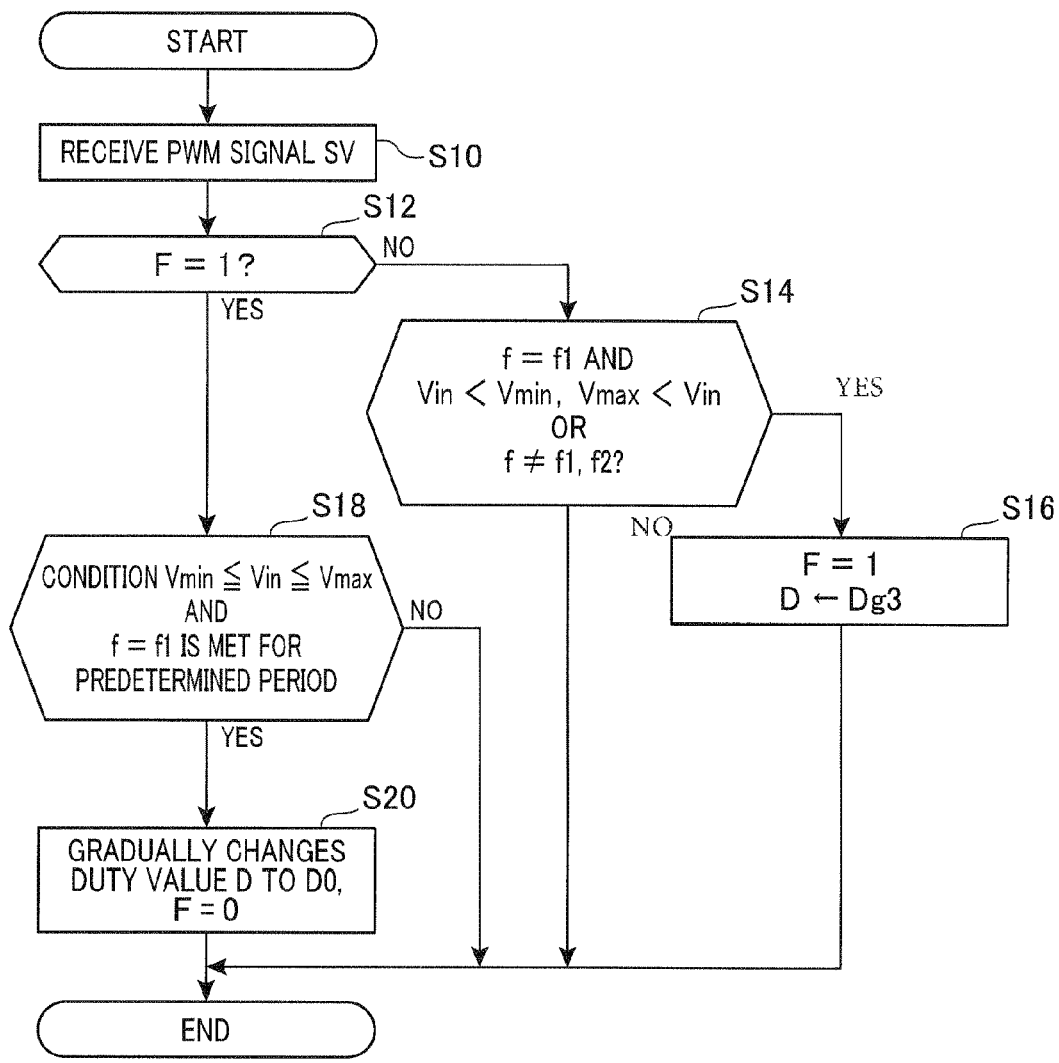
FIG. 3 is a flow chart showing a processing for restricting the duty value according to the first embodiment.

FIG. 3 is a flowchart showing a processing of the third guard value Dg3. This processing is executed repeatedly in a predetermined period by the control unit 40. It is noted that the control unit include a well-known processing unit, i.e., central processing unit (CPU) together with memory units such as RAM or ROM and the processing as shown in FIG. 3 is executed by the processing unit.

In the series of processing, at step S10, the control unit 40 receives the PWM signal SV. Next, at step S12, a flag F indicating a restriction by the third guard value Dg3 is determined whether or not the content of the flag is 1. As to the content of the flag, 1 represents the above-described restriction has been met and 0 represents the above-described restriction has not been met. When the judgment at step S12 is No (i.e., the flag 0), it is determined whether or not the following conditions a) to c) are met at step S14.

a) The PWM signal SV corresponds to the frequency f1 that represents normal operation, and the input voltage Vin is less than the lower limit voltage Vmin.
b) The PWM signal SV corresponds to the frequency f1 that represents normal operation, and the input voltage Vin exceeds the upper limit voltage Vmax.
c) The PWM signal SV corresponds to neither the frequency f1 that represents normal operation nor the frequency f2 that represents abnormal operation.

This processing is to determine whether or not a condition corresponding to the third guard value Dg3 is met. The condition c) is added to the conditions so as to detect an abnormality of the input voltage Vin represented by the PWM signal SV.

When a judgment at step 14 is Yes, the above-described condition is met, then proceeds to step 16. At step 16, the flag F is set to 1 and the duty value D is set to be the third guard value Dg3.

On the other hand, when the judgment is Yes at step 12, control then proceeds to step 18. In step 18, the control unit 40 determines whether or not conditions in which the PWM signal SV corresponds to the frequency f1, and the input voltage Vin is larger than or equal to the lower limit voltage Vmin and the input voltage Vin is smaller than or equal to the upper limit voltage Vmax have been met for a predetermined period. This processing is to determine whether or not duty value D is reset to the duty value D0 which is outputted by the minimum value selecting unit B18 as shown in FIG. 2. Then, when a judgment at step S18 is Yes, at step S20, the flag F is set to 0 and the duty value D is gradually changed to the duty value D0 where the current duty value D is calculated using a weighted averaging between previous duty value D and the duty value 0.

The series of processing is terminated when the processing is completed at step S16 or step S20, or a judgment at step S14 or step S18 is determined as NO. It is noted that the control unit 40 and software processing executed thereby correspond to first limiting means, second limiting means, first determining means, second determining means, enabling means, switching means, reset means and gradual changing means.

According to the above embodiments, the following advantages can be obtained.

1) Even when the PWM signal SV corresponds to the frequency f1, if the input voltage Vin is not within a range between the lower limit voltage Vmin and the upper limit voltage Vmax, the duty value D is restricted to the third guard value Dg3 and input voltage Vin is continued to be converted to the output voltage Vout. As a result, a voltage conversion between the input voltage Vin to the output voltage Vout can be maintained and at the same time, excessive voltage being applied between the input terminal and the output terminal of the main switching element Q1 can be avoided.

2) When the carrier frequency is neither frequencies f1 nor f2, the duty value D is set to the third guard value Dg3 and the conversion processing is maintained. Therefore, even when the conversion processing is maintained, excessive overvoltage applied between the input terminal and the output terminal of the main switching element Q1 can be avoided.

3) The duty value D is changed to D0 gradually when the PWM signal SV becomes normal under a condition that the duty value is restricted to the third guard value Dg3. Therefore, rapid change of the output voltage when the duty value D is reset to D0 can be avoided.

4) The carrier frequency f1 and f2 of the PWM signal SV are set to be larger than the switching frequency f3 of the inverter INV. Hence, inaccurate information about the input voltage caused by noise being superposed on the PWM signal can be avoided.

Other Embodiments

The above described embodiments can be modified as follows.

As to the first determining means, a voltage range of the input voltage Vin is not limited to a range between the lower limit voltage Vmin to the upper limit voltage Vmax. However, the voltage range can be below the upper limit voltage Vmax.

As to the second limiting means, a value lower than the third guard value Dg3 (within a range where power conversion can be performed) can be used as a fixed value. Moreover, once the duty value D is restricted to the third guard value Dg3, based on an equation $((nVout/D(1-D))<VQM$ which is modified from an equation $(Vin/(1-D))<VQM$ such that input voltage Vin is replaced to the output voltage Vout, where VQM represents breakdown voltage Q1 of the main switching element, the duty value D can be restricted to a value D that satisfies the equation. Even in this case, compared to a procedure where a guard value is promptly set by using a output voltage Vout once the duty value D is restricted to the third value Dg3 when the PWM signal SV is determined as abnormal, the second limiting means can be started immediately.

When the frequencies f1, f2 of the PWM signal SV is not high enough compared to the switching frequency f3 of the inverter INV, and if the PWM signal SV corresponds to neither frequencies f1 nor f2, the DC-DC converter CNV may be controlled to stop. This is because, in this case, even though the frequency is f2, it is considered that a period in which the PWM does not correspond to the frequencies f1 and f2 may be extended. According to the above-described embodiment, when the frequency is f2, even if noise is superposed to the PWM signal SV, since period for the noise being superposed to the PWM signal SV is longer, the control apparatus can recognize the frequency to be f2 more quickly.

It is not limited to the control apparatus that operates with an input voltage Vin which is equal to or below the upper voltage limit Vmax. For example, even when the control apparatus is configured such that a signal (information) is not superposed to the carrier frequency of the PWM signal SV, if the voltage of the high voltage battery 20 is close to the limit value in the voltage range, the duty value can be controlled to be a value in which the voltage applied to the main switching element Q1 does not exceed the breakdown voltage VQM.

As to switching means, it is not limited to the frequency selected from either frequency f1 or f2, however, a third frequency can be used for the carrier frequency, representing an isolation failure between the high voltage system and the low voltage system when the input voltage Vin greater than the upper limit voltage Vmax. In this case, when the third frequency is used, voltage exceeding the breakdown voltage of the switching element Q1 is not applied to the switching element Q1. However, when the isolation failure occurs, common mode noise may cause quality of the PWM signal SV to degrade. Therefore, even in this situation, the duty value being restricted to the third guard value Dg3 is effective to drive the DC-DC converter CNV.

As to the DC-DC converter, it is not limited to the above-described DC-DC converter. For example, a flyback converter having a single transformer can be employed. Even in this case, voltage based on the input voltage Vin and the duty value D can be applied between the input terminal and the output terminal of the switching element, when energy stored at the primary side coil during a period either ON or OFF period of the switching element is outputted via the secondary side coil during a period synchronizing to the other period of the switching element. Hence, the configuration according to the above-described embodiment can be effectively adapted.

Further, it is not limited to the flyback converter. For example, an active-clamp forward converter can be employed. Even in this case, a capacitor included in the active clamp circuit is charged with voltage corresponding to the duty value D so that voltage based on the input voltage Vin and the duty value D is applied between the input terminal and the output terminal of the switching element included in the converter circuit. Thus, when a converter in which the magnetic flux induced by voltage applied to the primary side coil is cancelled by applying capacitor voltage to the primary side coil (i.e., active clamp converter) is used, voltage in response to the capacitor voltage is applied to the switching element for a predetermined period and the capacitor voltage depends on the input voltage Vin and the duty value D. Accordingly, the configuration according to the above-described embodiment can be effectively adapted.

As to the modulated signal, it is not limited to carrier frequencies f1 and f2 of which frequency values are larger than the switching frequency f3 of the inverter INV connected to the on-vehicle main unit (i.e., motor generator 10). For example, when the power conversion circuit that supplies power to an on-vehicle auxiliary unit is connected to the high voltage battery 20, the carrier frequencies may preferably be set to be larger than the frequency of the switching element. Moreover, to enhance reliability of the PWM signal SV, the carrier frequencies may preferably set to be larger than the switching frequency of the DC-DC converter CNV.

Moreover, it is not limited to the signal which is applied by the PWM processing.

As to first limiting means, setting the first guard value Dg1 responding to the input voltage Vin is not limited to the drive processing exemplified as shown in FIG. 2.

In the above-described embodiment, a feedback control is performed with both as a control object. The control object is not limited to both the output current Iout and the output voltage Vout, however, either output current Iout or the output voltage Vout can be used for the feedback control.

According to the above-described embodiment, the current sensor 42 is used for detecting the output current of the DC-DC converter CNV. However, it is not limited to using the current sensor 42. For example, output current may be calculated by using a current value detected by current detecting circuit such as current mirror circuit disposed at the primary side circuit.

Regarding the input voltage Vin of the DC-DC converter CNV, it is not limited to a terminal voltage of the DC power source used for on-vehicle main unit, but may be DC power derived from other sources.

What is claimed is:

1. An apparatus for controlling a DC-DC converter that converts an input voltage having a predetermined voltage range to an output voltage, the DC-DC converter including a switching element of which a duty ratio is controlled by the apparatus to regulate the output voltage, a first transformer, a second transformer and a capacitor, a terminal voltage applied between an input terminal and an output terminal of the switching element varies depending on the duty ratio and the input voltage, the apparatus comprising:
    acquiring means for acquiring the input voltage;
    converting means for converting the input voltage to a modulated signal representing the input voltage;
    first limiting means for limiting the duty ratio of the switching element in response to the input voltage represented by the modulated signal;
    first determining means for determining whether or not the modulated signal is in an abnormal condition; and
    enabling means for enabling the DC-DC converter to continue to convert the input voltage to the output voltage when the first determining means determines the abnormal condition; and
    second limiting means for limiting the duty ratio of the switching element when the first determining means determines the abnormal condition, wherein the switching element includes a main switching element and a sub switching element, the main switching element, the sub switching element and the capacitor are disposed between the first transformer and the second transformer.

2. The apparatus according to claim 1, wherein
the second limiting means forcibly limits the duty ratio so as to limit the terminal voltage not to exceed a breakdown voltage between the input terminal and the output terminal of the switching element, the second limiting means forcibly limiting the duty ratio while the input voltage ranges within the predetermined range.

3. The apparatus according to claim 1, wherein
the converting means is configured to execute PWM processing to produce the modulated signal and the apparatus further comprises second determining means for determining whether or not the input voltage is within the predetermined range; and switching means for switching carrier frequency used for the PWM processing between a first carrier frequency used when the second determining means determines the input voltage is within the predetermined range and a second carrier frequency used when the second determining means determines the input voltage is out of the predetermined range, and the first determining means determines that the modulated signal is in an abnormal condition when the second determining means determines the input voltage is out of the predetermined range, even when the carrier frequency is set as the first carrier frequency.

4. The apparatus according to claim 1, wherein
the converting means is configured to execute PWM processing to produce the modulated signal and the apparatus further comprises second determining means for determining whether or not the input voltage is within the predetermined range; and switching means for switching carrier frequency used for the PWM processing between a first carrier frequency used when the second determining means determines the input voltage is within the predetermined range and a second carrier frequency used when the second determining means determines the input voltage is out of the predetermined range, and the first determining means determines the modulated signal is in an abnormal condition when the carrier frequency used for the PWM processing corresponds to neither the first carrier frequency nor the second carrier frequency.

5. The apparatus according to claim 3, wherein
the input voltage is a terminal voltage of a DC power source used for an on-vehicle main unit, the DC power source includes a power conversion circuit connected between the DC power source and the on-vehicle main unit, and the carrier frequency is set to be higher than a switching frequency of a switching element included in the power conversion circuit.

6. The apparatus according to claim 1, wherein
the apparatus includes reset means for resetting the second limiting means such that the reset limiting means resets the second limiting means to stop limiting the duty ratio and to set the duty ratio to be a value used for normal condition when the first determining means determines that the modulated signal is in normal condition.

7. The apparatus according to claim 6, wherein the reset means includes gradual changing means for gradually changing the duty ratio when the first determining means determines that the modulated signal is in normal condition such that the duty ratio is gradually changed to a duty ratio corresponding to the normal condition from a duty ratio limited by the second limiting means.

8. The apparatus according to claim 1, wherein
the sub switching element and the capacitor constitutes an active clamp circuit.

9. A conversion system comprising:
    a DC-DC converter that converts an input voltage having a predetermined range to an output voltage, the DC-DC converter including a switching element of which duty ratio is controlled to regulate the output voltage, a first transformer, a second transformer and a capacitor, a terminal voltage applied between an input terminal and an output terminal of the switching element varies depending on the duty ratio and the input voltage;
    acquiring means for acquiring the input voltage;
    converting means for converting the input voltage to a modulated signal representing the input voltage;
    first limiting means for limiting the duty ratio of the switching element in response to the input voltage represented by the modulated signal;
    first determining means for determining whether or not the modulated signal is in an abnormal condition;
    enabling means for enabling the DC-DC converter to continue to convert the input voltage to the output voltage when the first determining means determines the abnormal condition; and
    second limiting means for limiting the duty ratio of the switching element when the first determining means determines the abnormal condition, wherein the switching element includes a main switching element and a sub switching element, the main switching element, the sub switching element and the capacitor are disposed between the first transformer and the second transformer.

10. The conversion system according to claim 9, wherein the second limiting means forcibly limits the duty ratio so as to limit the terminal voltage not to exceed a breakdown voltage between the input terminal and the output terminal of the switching element, the second limiting means forcibly limiting the duty ratio while the input voltage ranges within the predetermined range.

11. The conversion system according to claim 9, wherein
the converting means is configured to execute PWM processing to produce the modulated signal and the system further comprises second determining means for determining whether or not the input voltage is within the predetermined range; and
switching means for switching carrier frequency used for the PWM processing between a first carrier frequency used when the second determining means determines the input voltage is within the predetermined range and a second carrier frequency used when the second determining means determines the input voltage is out of the predetermined range, and the first determining means determines the modulated signal is in abnormal condition when the second determining means determines the input voltage is out of the predetermined range, even when the carrier frequency is set as the first carrier frequency.

12. The conversion system according to claim 9, wherein
the converting means is configured to execute PWM processing to produce the modulated signal and the system further comprises second determining means for determining whether or not the input voltage is within the predetermined range; and
switching means for switching carrier frequency used for the PWM processing between a first carrier frequency used when the second determining means determines the input voltage is within the predetermined range and a second carrier frequency used when the second determining means determines the input voltage is out of the predetermined range, and the first determining means determines the modulated signal is in abnormal condition when the carrier frequency used for the PWM processing corresponds to neither the first carrier frequency nor the second carrier frequency.

13. The conversion system according to claim 11, wherein
the input voltage is a terminal voltage of a DC power source used for an on-vehicle main unit, the DC power source includes a power conversion circuit connected between the DC power source and the on-vehicle main unit, and the carrier frequency is set to be higher than a switching frequency of a switching element included in the power conversion circuit.

14. The conversion system according to claim 9, wherein
the conversion system includes reset means for resetting the second limiting means such that the reset limiting means resets the second limiting means to stop limiting the duty ratio and to set the duty ratio to be a value used for normal condition when the first determining means determines the modulated signal is in normal condition.

15. The conversion system according to claim 14, wherein
the reset means includes gradual changing means for gradually changing the duty ratio when the first determining means determines the modulated signal is in normal condition such that the duty ratio is gradually changed to a duty ratio corresponding to the normal condition from a duty ratio limited by the second limiting means.

16. The conversion system according to claim 9, wherein
the sub switching element and the capacitor constitutes an active clamp circuit.

* * * * *